United States Patent [19]
Klima

[11] Patent Number: 4,552,233
[45] Date of Patent: Nov. 12, 1985

[54] ROTARY DRILL BIT SEAL

[75] Inventor: Frank J. Klima, Virginia, Minn.

[73] Assignee: Warren A. Sturm, Minneapolis, Minn.

[21] Appl. No.: 632,255

[22] Filed: Jul. 18, 1984

Related U.S. Application Data

[63] Continuation of Ser. No. 431,397, Sep. 30, 1982, abandoned.

[51] Int. Cl.$^4$ ............................................. E21B 10/24
[52] U.S. Cl. .................................... 175/371; 384/94; 277/188 R
[58] Field of Search ....................... 175/371, 359, 372; 384/94; 277/188 R, 188 A, 177; 305/11

[56] References Cited

U.S. PATENT DOCUMENTS

| | | | |
|---|---|---|---|
| 3,982,595 | 9/1976 | Ott | 175/371 |
| 4,176,848 | 12/1979 | Lafuze | 175/371 |
| 4,179,003 | 12/1979 | Cooper | 175/371 |
| 4,249,622 | 2/1981 | Dysart | 384/94 X |
| 4,428,687 | 1/1984 | Zahradnik | 384/94 |

FOREIGN PATENT DOCUMENTS 2022170 12/1979 United Kingdom ................ 175/372

Primary Examiner—James A. Leppink
Assistant Examiner—Hoang C. Dang
Attorney, Agent, or Firm—Warren A. Sturm

[57] ABSTRACT

An improved seal for a rotary drill bit includes a pair of ring seals comprised of dissimilar materials disposed axially, adjacently to one another intermediate a stationary journal and a rotating cutter to present multiple sealing interfaces so that one or more of the ring seals may rotate with respect to another or the journal or rotating cutter. One of the ring seals may preferrably be fabricated of material exhibiting elastomeric characteristics.

5 Claims, 4 Drawing Figures

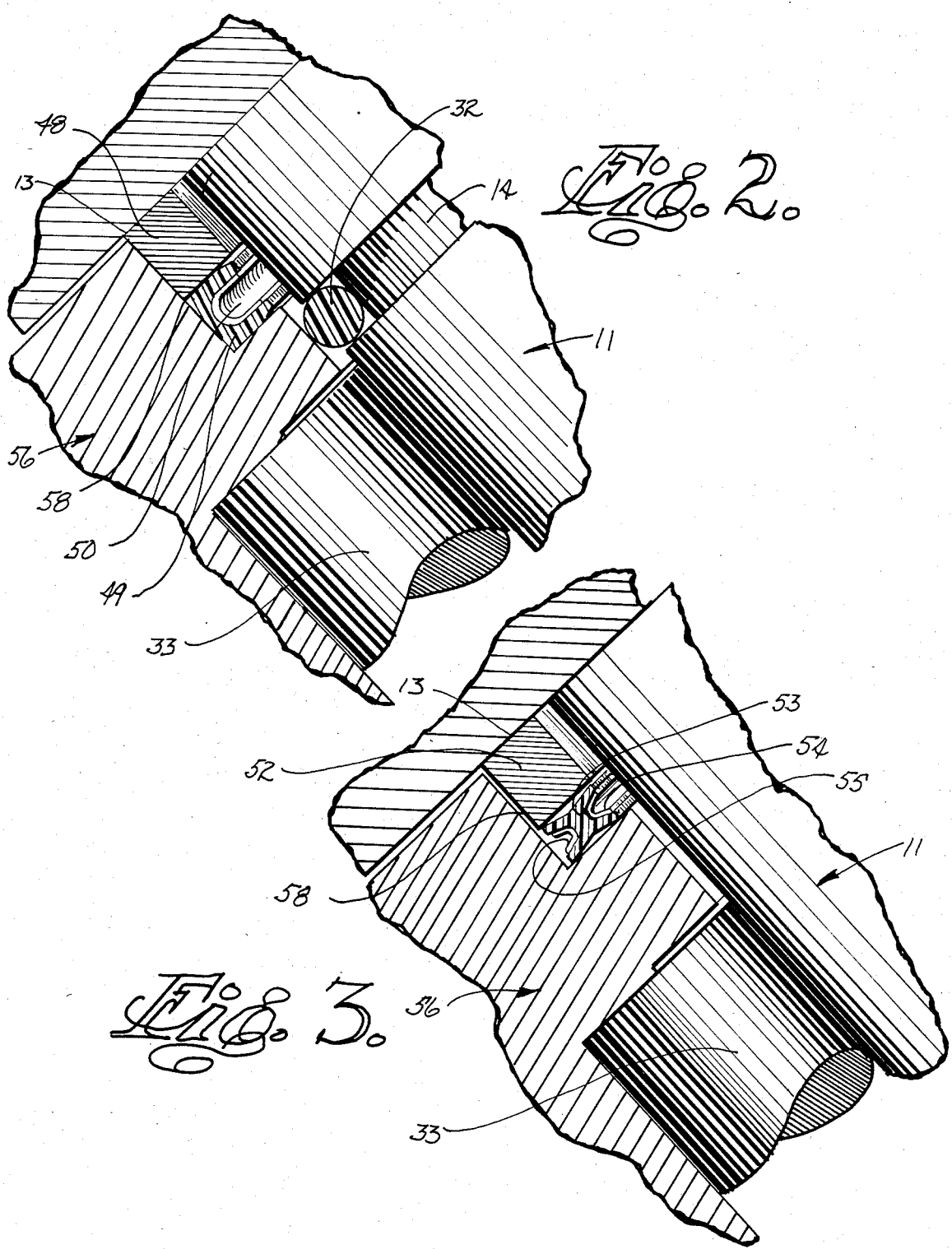

ROTARY DRILL BIT SEAL

This is a continuation of copending Ser. No. 431,397, filed Sept. 30, 1982 for ROTARY DRILL BIT SEAL, now abandoned.

BACKGROUND OF THE INVENTION

1. Field of the Invention

This invention relates generally to sealed rotary drill bits as may be used, for example, for drilling large diameter blast holes in taconite deposits. It is more particularly directed to an improved seal that is operable intermediate a rotatable cutter cone disposed on a journal extending from the leg, or legs of a drill bit. In a sealed drill bit of the class with which my invention is concerned, it is necessary to prevent contaminants in the form of small particles of the materials into which holes are drilled from entering a complex array of bearing devices that are used to support the cutter cone on the journal under adverse conditions of high pressures, forces and heat and to prevent the loss of lubricant placed in and around such bearings intermediate the interior of the cutter cone and the journal.

2. Description of the Prior Art

The following is a list of prior art in the form of United States Letters Patent that relate, in one way or another, to the field of my invention:

| U.S. Pat. No. | Inventor | Issued |
| --- | --- | --- |
| 3,193,028 | Radzimovsky | July 6, 1965 |
| 3,251,634 | Dareing | May 17, 1966 |
| 3,656,764 | Robinson | April 18, 1972 |
| 3,866,695 | Jackson | February 18, 1975 |
| 3,921,735 | Dysart | November 25, 1975 |
| 4,140,189 | Garner | February 20, 1979 |
| 4,183,417 | Levefelt | January 15, 1980 |

A consideration of the disclosures of the prior art set forth above will indicate a wide range of fields that have been proposed, stemming with a basic "O"-ring to complicated labryinth configurations.

BRIEF SUMMARY OF THE INVENTION

My invention provides an effective seal that is operable to provide a substantially impervious barrier to the entry of contaminants as well as the loss of lubricant in a sealed roller cone bit. This is accomplished by providing a smooth surface on the journal at the outer end adjacent a radially extending portion of the journal-leg of a bit and providing an inwardly opening groove or notch at the outer inside periphery of the roller cutting cone having a finite axial length, and disposing a plurality of rings of dissimilar material, at least one of such rings being comprised of elastomeric or resilient material. As will be described in greater detail below, the use of the plurality of the axially displaced rings of dissimilar material provides a plurality of axially spaced interfaces between adjacent rings which extend from the inner end of the groove in the roller cutter cone to the radially extending face of the leg adjacent the upper end of the journal.

It is therefore an object of my invention to provide an improved feel for a rotary drill bit.

BRIEF DESCRIPTION OF THE DRAWINGS

FIG. 2 is an enlarged fragmentary portion of FIG. 1 illustrating a further embodiment of my invention;

FIG. 3 is an enlarged fragmentary portion of FIG. 1 illustrating a further embodiment of my invention.

DETAILED DESCRIPTION OF THE ILLUSTRATED EMBODIMENTS

Figure 1:
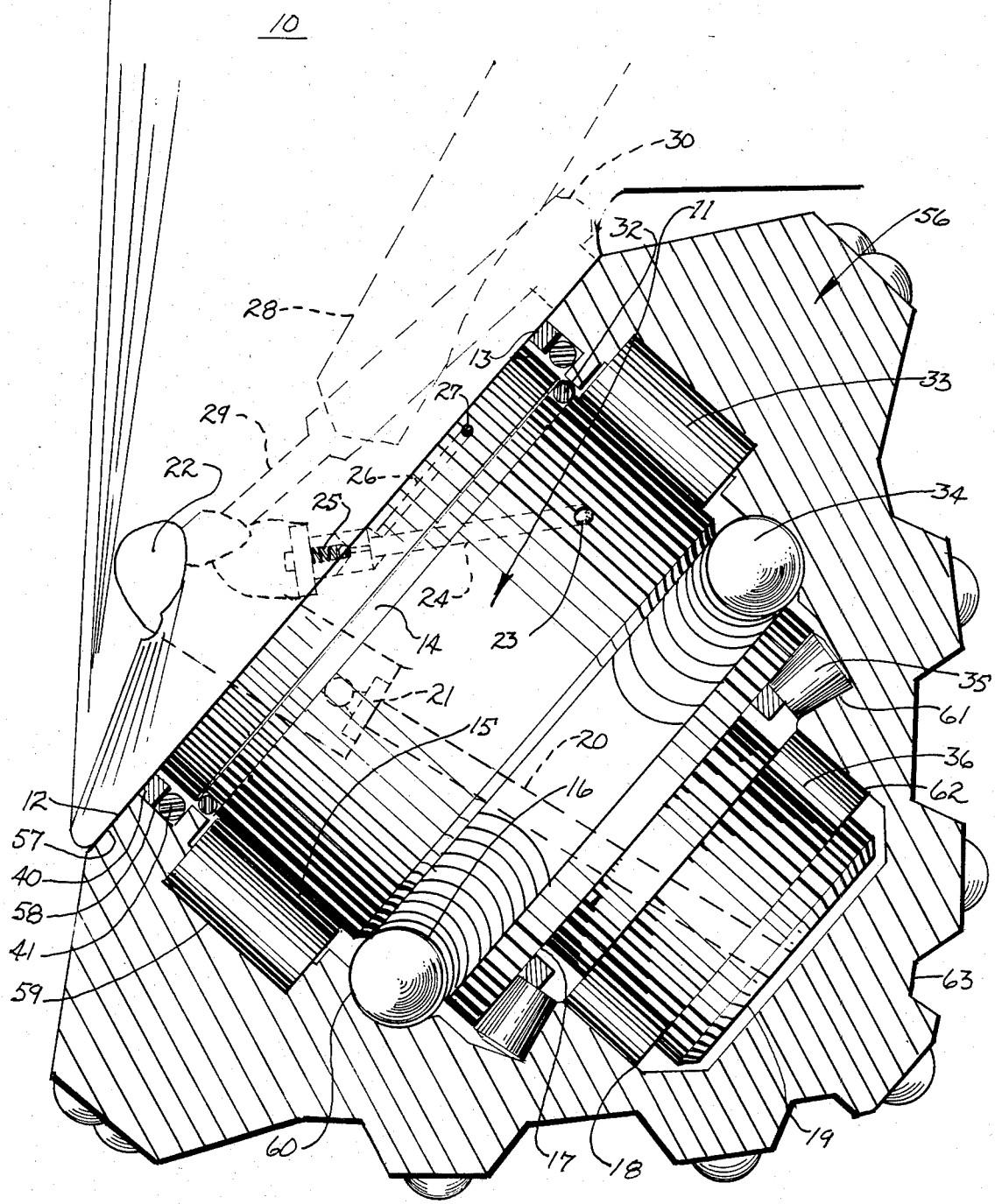
FIG. 1 is a fragmentary side view of a portion of the leg of a rotary drill bit illustrating a journal, thereon, in full outline and a rotary cutter cone in section to show the relationship with my improved seal.

Referring to FIG. 1 of the drawings, a leg of, for example, a three-cutter rotary drill bit is indicated generally by reference character 10. Depending from at a slightly downward angle and forming a part of leg 10 is a journal 11 for rotatably mounting a rotary cutter cone 56.

Journal 11 includes a radially extending surface 12 at its upper end, to provide a seal surface 13, a seal groove 14, a roller bearing surface 15, a ball bearing race 16, a radially extending roller bearing surface 17, a roller bearing race 18 and a lower end 19. A passage for conveying lubricant to the lower end of journal 11 is indicated by reference character 20 and is provided with a lubricant fitting 21 that is accessible through an air exhaust passage and port 22 opening outwardly from the side of leg 10 and extending inwardly of leg 10 adjacent lubricant fitting 21. A lubricant bypass inlet 23 is shown disposed on roller bearing surface 15 and is connected through a duct 24 to a pressure relief valve 25 and to a lubricant bypass outlet port 27 in journal 11 through further duct 26. An air duct 28 extending upwardly through leg 10 and adapted for connection to a source of air under pressure, is connected to exhaust port 22 through a restriction duct 29 and to a position adjacent the upper end of rotating cone 56 through air duct 30.

Rotary cutter cone 56 has a radially extending upper end portion 57, a seal groove 58 disposed adjacent radial seal surface 13 and extending axially therefrom and opening inwardly toward journal 11, a roller bearing race 59, a ball bearing race 60, a thrust roller bearing race 61, a roller bearing surface 62 and a lower end 63. An O-ring seal 32 is shown disposed in seal groove 14 on journal 11 and in sealing contact with an inner surface of rotary cutter cone 56. Cutter 56 is rotatably journaled on journal 31 by roller bearings 33, ball bearings 34, tapered roller thrust bearings 35 and roller bearings 36.

While the seal effected by the individual seal ring members in seal groove 58 in roller cutter cone 56 is provided by conjoint action, the seal is shown comprised of an upper seal 40 which may be comprised of a cast iron piston ring and a lower seal 41 which may be comprised of elastomeric material such as rubber in the form of an O-ring. The sealing is accomplished by compression of the elastomeric "O"-ring against the piston ring resulting in three sealing surfaces.

In the embodiment of FIG. 2, upper seal ring 48 is substantially the same as that shown in FIG. 1 and lower ring seal 49 is of the substantial "C" shape and includes a resilient C-shaped metallic insert 50.

The embodiment of FIG. 3 illustrates a metallic upper ring seal 52 and a lower ring seal in the form of an "X"-shaped member of elastomeric material having resilient metallic ring inserts 54 and 55.

Figure 4:
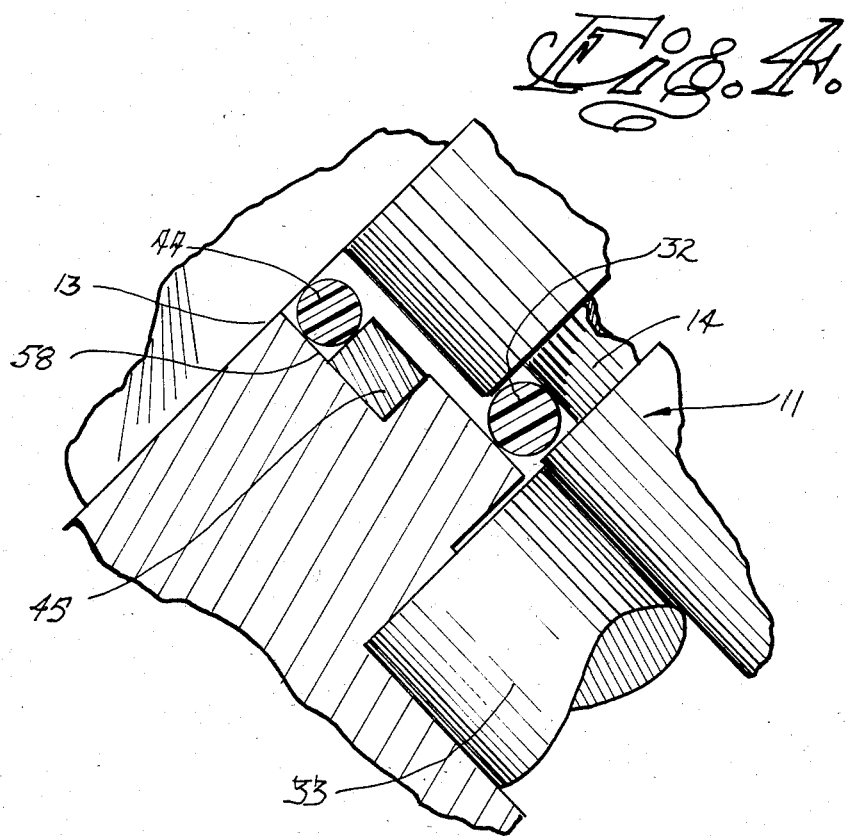
FIG. 4 is an enlarged fragmentary portion of FIG. 1 illustrating still another embodiment of my invention.

In the embodiment of FIG. 4, an upper ring seal 44 is shown comprised of elastomeric material and the lower ring seal 45 may be comprised of cast iron, or the like.

OPERATION OF THE ILLUSTRATED EMBODIMENTS

Referring first to FIG. 1 of the drawings, with a typical rotary drill bit in a static inoperative state, lubricant may be supplied to the interior intermediate journal 11 and the inside of roller cutter cone 56 until the release of lubricant through pressure relief valve 25 to exhaust port 22 indicates that the space or cavity has been completely filled. The drill bit may then be placed in service.

Under operative conditions, O-ring 32 is operable as expected to assume a sealing position under the pressure exerted from the lubricant disposed in the lubricating cavity. Seal rings 40 and 41, as in FIG. 1 of the drawings, are operable, as rotating cutter cone 56 rotates to effect an axially upwardly extending seal. While not completely understood, it is noted that seal rings 40 and 41 may at some time rotate one with respect to the other and with cutter cone 56 or remain stationary with respect thereto. It has been observed under actual operating conditions that there is relative rotatable motion between the individual seal rings and radially extending bearing surface 12 on journal 11, the lower portion of seal groove 58 and seal surface 13. As the pressure of the lubricant inside of cone 56 increases due to heat generated in the drilling process, lubricant may flow from port 23 on roller bearing surface 15 through duct 24 and duct 26 to exit through port 27 to fill space 13 between seal rings 40 and 41 and journal 11. With use, a considerable amount of wear of bearings on leg 10 and on cutter cone 56 will occur and it may be seen that the elastomeric properties of seal ring 41 will serve to bias seal ring 40 upwardly toward radial seal surface 13 on journal 11 to maintain the integrity of the seal. A substantial increase in the life of roller bits has been experienced through the use of my seal over those known to exist.

What is claimed is:

1. A seal for a rotary drill bit of the class including a journal and a cutter cone rotatably disposed on the journal comprising, in combination:

a stationary journal having a lower end and an upper end, said upper end having a radially extending portion including a surface for engagement with the axial end of a seal;

a hollow cutter cone rotatably disposed on said journal and including a radially extending upper end adjacent to the radially extending portion on the upper end of said journal and a seal receiving groove opening axially upwardly and radially inwardly on the upper end of the interior of said hollow cutter cone and adapted to receive a seal extending intermediate the lower portion of said groove and the radially extending porton of said stationary journal; and a plurality of sealing rings, including first and second sealing rings formed of materials of dissimilar characteristics so that one of said first and second rings is compressible and the other is incompressible axially in said seal receiving groove disposed axially in said seal receiving groove and intermediate the lower radially extending portion of said groove and the radially extending portion of said stationary journal whereby the circumferential outer surfaces of said sealing rings are in engagement with the groove in said cutter cone, the sealing rings are disposed in serial axial engagement intermediate the radially extending portion on said stationary journal and the lower portion of the groove on said cutter cone and the inner circumferential portions of said rings are radially spaced from said stationary journal and said sealing rings are confined solely axially between the lower portion of said seal receiving groove and the radially extending portion on said stationary journal.

2. The apparatus of claim 1 in which a duct extends intermediate the lower and upper ends of the journal.

3. The apparatus of claim 1 in which one of the rings includes means for providing an axial biasing force in the groove in the cutter cone.

4. The apparatus of claim 1 in which one of the rings in the groove in the cutter cone is comprised of material exhibiting elastomeric properties.

5. The apparatus of claim 1 in which the other of the sealing rings is disposed adjacent the radially extending portion of the journal.

* * * * *